(12) United States Patent
Lee et al.

(10) Patent No.: US 12,428,313 B2
(45) Date of Patent: Sep. 30, 2025

(54) POSITIVE ELECTRODE ACTIVE MATERIAL PRECURSOR FOR SECONDARY BATTERY, POSITIVE ELECTRODE ACTIVE MATERIAL, PREPARATION METHODS THEREOF, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Min Joon Lee, Daejeon (KR); Jun Won Lee, Daejeon (KR); In Kook Jun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 690 days.

(21) Appl. No.: 17/433,345

(22) PCT Filed: Feb. 27, 2020

(86) PCT No.: PCT/KR2020/002782
§ 371 (c)(1),
(2) Date: Aug. 24, 2021

(87) PCT Pub. No.: WO2020/175925
PCT Pub. Date: Sep. 3, 2020

(65) Prior Publication Data
US 2022/0048789 A1 Feb. 17, 2022

(30) Foreign Application Priority Data
Feb. 28, 2019 (KR) ........................ 10-2019-0024312

(51) Int. Cl.
*C01G 53/82* (2025.01)
*H01M 10/0525* (2010.01)

(52) U.S. Cl.
CPC .......... *C01G 53/82* (2025.01); *C01P 2004/45* (2013.01); *C01P 2004/62* (2013.01);
(Continued)

(58) Field of Classification Search
CPC ... C01G 53/006; C01G 53/44; C01P 2002/72; C01P 2002/85; C01P 2004/03;
(Continued)

(56) References Cited

U.S. PATENT DOCUMENTS

2006/0083989 A1 4/2006 Suhara et al.
2008/0241053 A1 10/2008 Suhara et al.
(Continued)

FOREIGN PATENT DOCUMENTS

CN 104220378 A 12/2014
CN 107408689 A 11/2017
(Continued)

OTHER PUBLICATIONS

JP2013230968a, Fujii, "Metal compound composition and method for manufacturing the same", machine English translation retrieved from https://worldwide.espacenet.com/ Date: Mar. 1, 2024 (Year: 2013).*

(Continued)

*Primary Examiner* — Matthew T Martin
*Assistant Examiner* — Jared Hansen
(74) *Attorney, Agent, or Firm* — Lerner David LLP (57) ABSTRACT

A method of preparing a positive electrode active material precursor for a secondary battery includes continuously adding a nickel (Ni), cobalt (Co), and manganese (Mn) transition metal cation-containing solution, an alkaline solution, and an ammonium ion-containing solution to a reactor, and forming a positive electrode active material precursor, in which nickel (Ni) and cobalt (Co) are in non-oxidized hydroxide forms and manganese (Mn) is in an oxidized form, by co-precipitation while a gas is not added or an oxygen-containing gas is continuously added to the reactor. A positive electrode active material precursor for a secondary battery is also provided which includes nickel (Ni), (Continued)

cobalt (Co), and manganese (Mn), wherein the nickel (Ni) and the cobalt (Co) are in non-oxidized hydroxide forms, and the manganese (Mn) is in an oxidized form.

14 Claims, 5 Drawing Sheets

(52) U.S. Cl.
CPC ....... *C01P 2004/64* (2013.01); *C01P 2006/11* (2013.01); *C01P 2006/40* (2013.01); *H01M 10/0525* (2013.01)

(58) Field of Classification Search
CPC .............. C01P 2004/45; C01P 2004/50; C01P 2004/62; C01P 2004/64; C01P 2006/11; C01P 2006/40; H01M 4/505; H01M 4/525; H01M 10/052; H01M 10/0525; Y02E 60/10
See application file for complete search history.

(56) References Cited

U.S. PATENT DOCUMENTS

| | | | |
|---|---|---|---|
| 2009/0212267 A1* | 8/2009 | Dobbs | H01M 4/1397 252/521.2 |
| 2010/0316910 A1 | 12/2010 | Kajiyama et al. | |
| 2011/0027651 A1* | 2/2011 | Shin | H01M 4/5825 429/223 |
| 2012/0270107 A1 | 10/2012 | Toya et al. | |
| 2013/0168600 A1* | 7/2013 | Niittykoski | C01G 53/50 252/182.1 |
| 2013/0330626 A1 | 12/2013 | Kajiyama et al. | |
| 2015/0104644 A1 | 4/2015 | Iwata et al. | |
| 2015/0236354 A1* | 8/2015 | Binder | H01M 4/925 502/159 |
| 2016/0172673 A1 | 6/2016 | Toya et al. | |
| 2017/0250404 A1* | 8/2017 | Cho | C01G 53/42 |
| 2017/0317349 A1 | 11/2017 | Ju et al. | |
| 2017/0338485 A1 | 11/2017 | Toya et al. | |
| 2018/0026265 A1 | 1/2018 | Kajiyama et al. | |
| 2018/0205080 A1 | 7/2018 | Toya et al. | |
| 2018/0287135 A1* | 10/2018 | Shin | H01M 4/366 |
| 2019/0020022 A1* | 1/2019 | Jeong | H01M 10/0525 |
| 2020/0006762 A1* | 1/2020 | Park | H01M 4/505 |
| 2020/0006769 A1* | 1/2020 | Paulsen | H01M 4/505 |
| 2020/0044250 A1 | 2/2020 | Toya et al. | |
| 2020/0058934 A1 | 2/2020 | Kajiyama et al. | |

FOREIGN PATENT DOCUMENTS

| | | | | |
|---|---|---|---|---|
| JP | 2010114088 A | | 5/2010 | |
| JP | 2013144625 A | | 7/2013 | |
| JP | 2013230968 A | * | 11/2013 | ............ C01G 45/00 |
| JP | 2013230969 A | | 11/2013 | |
| JP | 6201146 B2 | | 9/2017 | |
| JP | 2019021422 A | | 2/2019 | |
| KR | 20060122450 A | | 11/2006 | |
| KR | 100694567 B1 | | 3/2007 | |
| KR | 100765970 B1 | | 10/2007 | |
| KR | 20110111058 A | | 10/2011 | |
| KR | 20120099098 A | | 9/2012 | |
| KR | 20130130357 A | | 12/2013 | |
| KR | 20140141606 A | | 12/2014 | |
| KR | 101502658 B1 | | 3/2015 | |
| KR | 20160037960 A | | 4/2016 | |
| KR | 20170063395 A | * | 6/2017 | .......... H01M 4/0471 |
| KR | 101768374 B1 | | 8/2017 | |
| KR | 20170103389 A | * | 9/2017 | |
| KR | 20170117063 A | | 10/2017 | |
| KR | 20180063862 A | | 6/2018 | |

OTHER PUBLICATIONS

Zhao, Junkai, et al. "The role of a MnO2 functional layer on the surface of Ni-rich cathode materials: towards enhanced chemical stability on exposure to air." Ceramics International 44.11 (2018): 13341-13348 (Year: 2018).*
Anu Prathap, M.U. et al., "Facile preparation of Ni(OH)2—MnO2 hybrid material and its application in the electrocatalytic oxidation of hydrazine", Journal of Hazardous Materials, Sep. 29, 2013, pp. 766-774, vol. 262, Elsevier.
Extended European Search Report including Written Opinion for Application No. 20763320.7 dated Mar. 18, 2022, pp. 1-11.
Lee, M.H. et al., "Synthetic optimization of Li[Ni1/3Co1/3Mn1/3]O2 via co-precipitation", Electrochimica Acta, Sep. 11, 2004, pp. 939-948, vol. 50, Elsevier.
Li, J. et al., "Hierarchical Ni(OH)2-MnO2 Array as Supercapacitor Electrode with High Capacity", Advanced Materials Interfaces, Dec. 11, 2018, p. 1801470 (1-6), Wiley-VCH.
Li, M. et al., "3D-architectured nickel-cobalt-manganese layered double hydroxide/reduced graphene oxide composite for high-performance supercapacitor", Chemical Physics Letters, Oct. 13, 2015, pp. 5-10, vol. 640, Elsevier.
Oyedotun, K.O. et al., "Synthesis of ternary NiCo—MnO2 nanocomposite and its application as a novel high energy supercapattery device", Chemical Engineering Journal, Oct. 31, 2017, pp. 416-433, vol. 335, Elsevier.
Sanchez, J.S. et al., "Porous NiCoMn ternary metal oxide/graphene nanocomposites for high performance hybrid energy storage devices", Electrochimica Acta, May 12, 2018, pp. 44-56, vol. 279, Elsevier.
Wu, T. et al., "Caterpillar structured Ni(OH)2@MnO2 core/shell nanocomposite arrays on nickel foam as high performance anode materials for lithium ion batteries", RSC Advances, Jan. 1, 2016, pp. 15541-15548, vol. 6.
International Search Report for Application No. PCT/KR2020/002782 mailed Jun. 9, 2020, pp. 1-2.

* cited by examiner

POSITIVE ELECTRODE ACTIVE MATERIAL PRECURSOR FOR SECONDARY BATTERY, POSITIVE ELECTRODE ACTIVE MATERIAL, PREPARATION METHODS THEREOF, AND LITHIUM SECONDARY BATTERY INCLUDING THE POSITIVE ELECTRODE ACTIVE MATERIAL

CROSS-REFERENCE TO RELATED APPLICATIONS

The present application is a national stage entry under 35 U.S.C. § 371 of International Application No. PCT/KR2020/002782 filed on Feb. 27, 2020, which claims priority to Korean Patent Application No. 10-2019-0024312, filed on Feb. 28, 2019, the disclosures of which are incorporated by reference herein in their entirety.

TECHNICAL FIELD

The present invention relates to a positive electrode active material precursor for a secondary battery, a positive electrode active material, methods of preparing the positive electrode active material precursor and the positive electrode active material, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been mainly used as a positive electrode active material of the lithium secondary battery. Also, as a method to improve low thermal stability while maintaining excellent reversible capacity of the $LiNiO_2$, a method of substituting a portion of nickel (Ni) with cobalt (Co) or manganese (Mn) has been proposed. However, with respect to $LiNi_{1-\alpha}Co_\alpha O_2$ ($\alpha$=0.1 to 0.3) in which a portion of nickel is substituted with cobalt, it exhibits excellent charge/discharge characteristics and life characteristics, but has low thermal stability. With respect to a nickel manganese-based lithium composite metal oxide, in which a portion of nickel (Ni) is substituted with manganese (Mn) having excellent thermal stability, and a nickel cobalt manganese-based lithium composite metal oxide in which a portion of nickel (Ni) is substituted with manganese (Mn) and cobalt (Co) (hereinafter, simply referred to as 'NCM-based lithium oxide'), they are advantageous in that cycle characteristics and thermal stability are relatively better.

However, due to the recent increase in the price of cobalt (Co), a lithium-rich (Li-rich) NCM-based positive electrode active material capable of meeting high capacity while containing a relatively low amount of the cobalt (Co) has been developed. The Li-rich NCM-based positive electrode active material has high energy density and a cost advantage.

In general, a precursor of the NCM-based positive electrode active material is synthesized by a co-precipitation method, wherein the precursor is mainly in the form of hydroxide or carbonate. With respect to a hydroxide precursor, $Ni_{1-\alpha 1-\beta 1}Co_{\alpha 1}Mn_{\beta 1}(OH)_2$ ($0<\alpha 1<1.0$, $0<\beta 1<1.0$), since primary particles have a relatively large diameter of about 1 μm to about 3 μm and are not dense, it is disadvantageous in that ionic conductivity is low and electrochemical performance and density are low. With respect to a carbonate precursor, $Ni_{1-\alpha 2-\beta 2}Co_{\alpha 2}Mn_{\beta 2}CO_3$ ($0<\alpha 2<1.0$, $0<\beta 2<1.0$), since primary particles have a relatively small diameter of about 10 nm to about 40 nm and pores in a secondary particle become very large due to the release of carbon dioxide during a sintering process, strength is reduced, and thus, it is disadvantageous in that the particles are crushed during rolling and density is very low.

Thus, there is still a need to develop a positive electrode active material, which may exhibit high density due to small primary particles and dense secondary particles, may prevent particle breakage during rolling due to excellent particle strength, and may exhibit excellent battery performance, such as high capacity, high efficiency, and high rate capability, when the positive electrode active material is used in a secondary battery, and its precursor.

DISCLOSURE OF THE INVENTION

Technical Problem

An aspect of the present invention provides an NCM-based positive electrode active material precursor, which may exhibit high density due to small primary particles and dense secondary particles and may exhibit excellent particle strength, and a method of preparing the same.

Another aspect of the present invention provides a positive electrode active material, as a lithium (Li)-rich NCM-based positive electrode active material prepared by using the positive electrode active material precursor, which may exhibit excellent battery performance, such as high capacity, high efficiency, and high rate capability, when the positive electrode active material is used in a secondary battery, and a method of preparing the same.

Technical Solution

According to an aspect of the present invention, there is provided a positive electrode active material precursor for a secondary battery which includes nickel (Ni), cobalt (Co), and manganese (Mn), wherein the nickel (Ni) and the cobalt (Co) are in non-oxidized hydroxide forms, and the manganese (Mn) is in an oxidized form.

According to another aspect of the present invention, there is provided a method of preparing a positive electrode active material precursor for a secondary battery which includes the steps of: continuously adding a nickel (Ni), cobalt (Co), and manganese (Mn) transition metal cation-containing solution, an alkaline solution, and an ammonium ion-containing solution to a reactor; and forming a positive electrode active material precursor, in which nickel (Ni) and cobalt (Co) are in non-oxidized hydroxide forms and manganese (Mn) is in an oxidized form, by co-precipitation while a gas is not added or an oxygen-containing gas is continuously added to the reactor.

According to another aspect of the present invention, there is provided a method of preparing a positive electrode active material for a secondary battery which includes the steps of: mixing the positive electrode active material precursor prepared as described above with a lithium raw material; and sintering at 750° C. to 1,000° C. after the mixing to form a lithium composite transition metal oxide.

According to another aspect of the present invention, there is provided a positive electrode active material prepared as described above, and a positive electrode and a lithium secondary battery which include the same.

Advantageous Effects

According to the present invention, an NCM-based positive electrode active material precursor, which may exhibit high density due to small primary particles and dense secondary particles and may exhibit excellent particle strength, may be prepared.

Also, a lithium (Li)-rich NCM-based positive electrode active material prepared by using the positive electrode active material precursor may exhibit excellent battery performance, such as high capacity, high efficiency, and high rate capability, when the positive electrode active material is used in a secondary battery.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material Precursor>

The positive electrode active material precursor of the present invention is prepared by a method including the steps of: continuously adding a nickel (Ni), cobalt (Co), and manganese (Mn) transition metal cation-containing solution, an alkaline solution, and an ammonium ion-containing solution to a reactor; and forming a positive electrode active material precursor, in which nickel (Ni) and cobalt (Co) are in non-oxidized hydroxide forms and manganese (Mn) is in an oxidized form, by co-precipitation while a gas is not added or an oxygen-containing gas is continuously added to the reactor.

The method of preparing the positive electrode active material precursor will be described in detail for each step.

First, a nickel (Ni), cobalt (Co), and manganese (Mn) transition metal cation-containing solution, an alkaline solution, and an ammonium ion-containing solution are continuously added to a reactor.

The transition metal cation-containing solution includes a nickel (Ni)-containing raw material, a cobalt (Co)-containing raw material, and a manganese (Mn)-containing raw material.

The nickel (Ni)-containing raw material, for example, may include nickel-containing acetic acid salts, nitrates, sulfates, halides, sulfides, hydroxides, oxides, or oxyhydroxides, and may specifically include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt (Co)-containing raw material may include cobalt-containing acetic acid salts, nitrates, sulfates, halides, sulfides, hydroxides, oxides, or oxyhydroxides, and may specifically include $Co(OH)_2$, CoOOH, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese (Mn)-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal cation-containing solution may be prepared by adding the nickel (Ni)-containing raw material, the cobalt (Co)-containing raw material, and the manganese (Mn)-containing raw material to a solvent, specifically water, or a mixture of water and an organic solvent (e.g., alcohol etc.) which may be uniformly mixed with the water, or may be prepared by mixing an aqueous solution of the nickel (Ni)-containing raw material, an aqueous solution of the cobalt (Co)-containing raw material, and the manganese (Mn)-containing raw material.

The ammonium ion-containing solution, as a complexing agent, for example, may include $NH_4OH$, $(NH_4)_2SO_4$, $NH_4NO_3$, $NH_4Cl$, $CH_3COONH_4$, $(NH_4)_2CO_3$, or a combination thereof, but the present invention is not limited thereto. The ammonium ion-containing solution may be used in the form of an aqueous solution, and, in this case, water or a mixture of water and an organic solvent (specifically, alcohol etc.), which may be uniformly mixed with the water, may be used as a solvent.

The alkaline solution, as a precipitant, may include a hydroxide of alkali metal or alkaline earth metal, such as NaOH, KOH, or $Ca(OH)_2$, a hydrate thereof, or an alkaline compound of a combination thereof. The alkaline solution may also be used in the form of an aqueous solution, and, in this case, water or a mixture of water and an organic solvent (specifically, alcohol etc.), which may be uniformly mixed with the water, may be used as a solvent. The alkaline solution is added to adjust a pH of a reaction solution, wherein the alkaline solution may be added in an amount such that the pH of the metal solution is 11 to 13.

Next, a positive electrode active material precursor, in which nickel (Ni) and cobalt (Co) are in non-oxidized hydroxide forms and manganese (Mn) is in an oxidized form, is formed by co-precipitation while a gas is not added or an oxygen-containing gas is continuously added to the reactor.

In a conventional precursor co-precipitation reaction of a typical NCM-based positive electrode active material, nitrogen ($N_2$) or argon (Ar) gas was added to synthesize a precursor in the form of hydroxide in an inert atmosphere, or nitrogen ($N_2$), argon (Ar), or carbonic acid ($H_2CO_3$) gas was added to synthesize a precursor in the form of carbonate. However, with respect to the conventional precursor in the form of hydroxide, since primary particles had a relatively large diameter of about 1 μm to about 3 μm and were not dense, it was disadvantageous in that ionic conductivity was low and electrochemical performance and density were low, and, with respect to the precursor in the form of carbonate, since primary particles had a relatively small diameter of about 10 nm to about 40 nm and pores in the particle became very large due to the release of carbon dioxide during a sintering process, strength was reduced, and thus, it was disadvantageous in that the particles were crushed during rolling and density was very low.

Thus, in the present invention, in order to provide a NCM-based positive electrode active material precursor which may exhibit high density due to small primary particles and dense secondary particles and may exhibit excellent particle strength, a positive electrode active material precursor is prepared by co-precipitation while a gas is not added or an oxygen-containing gas is continuously added during the precursor co-precipitation reaction. Accordingly, a positive electrode active material precursor, in which nickel (Ni) and cobalt (Co) are in non-oxidized hydroxide forms and manganese (Mn) is in an oxidized form, is formed.

In the present invention, a gas is not added or an oxygen-containing gas is continuously added during the co-precipitation reaction. Accordingly, manganese (Mn) ions may be precipitated as an oxide by combining with oxygen ($O_2$) gas added or oxygen ($O_2$) gas in the air even if the manganese (Mn) ions do not react with an alkaline compound after they are coordinated with ammonium ions, or even if the manganese (Mn) ions are precipitated by reacting with the alkaline compound, since the precipitates may be oxidized in the reactor, a reaction rate may be very fast, and thus, small primary particles are formed.

Unlike a typical case in which nitrogen ($N_2$), argon (Ar), and/or carbonic acid ($H_2CO_3$) gases are added during a co-precipitation reaction, nitrogen ($N_2$), argon (Ar), and carbonic acid ($H_2CO_3$) gases may not be added to the reactor during the co-precipitation reaction in the present invention. Also, an oxygen-containing gas may be continuously added, wherein, according to an embodiment of the present invention, a flow rate of oxygen ($O_2$) gas added may more specifically satisfy the following Equation 1.

(amount (mol) of manganese (Mn) added per hour× 2)/0.089≤flow rate (L/h) of oxygen ($O_2$) gas added≤1.1×{(amount (mol) of manganese (Mn) added per hour×2)/0.0891     [Equation 1]

For example, in a case in which a transition metal cation-containing solution with a concentration of 3.2 mol/L including nickel (Ni), cobalt (Co), and manganese (Mn) in a ratio of 2:1:7 is continuously added at a rate of 0.3 L per hour, a flow rate of the oxygen ($O_2$) gas added may be in a range of 15.1 L/h to 16.61 L/h. If, with respect to a gas containing 20 vol % of oxygen ($O_2$) gas, a flow rate of the total gas added may be in a range of 75.5 L/h to 83.05 L/h.

Since the flow rate (L/h) of the oxygen ($O_2$) gas added is satisfied, a positive electrode active material precursor, in which nickel (Ni) and cobalt (Co) are in non-oxidized hydroxide forms and manganese (Mn) is in an oxidized form, may be formed, and, accordingly, the positive electrode active material precursor may exhibit high density due to small primary particles and dense secondary particles and may exhibit excellent particle strength.

The positive electrode active material precursor prepared according to an embodiment of the present invention may be represented by Formula 1 below.

$$x(Ni_{1-a-b}Co_aM^1{}_b(OH)_2) \cdot y(MnO_2)$$     [Formula 1]

In Formula 1, $M^1$ includes at least one selected from the group consisting of iron (Fe), vanadium (V), molybdenum (Mo), aluminum (Al), sodium (Na), titanium (Ti), copper (Cu), chromium (Cr), niobium (Nb), zirconium (Zr), magnesium (Mg), and potassium (K), 0.25≤x≤0.5, 0.5≤y≤0.75, x+y=1, 0<a≤0.6, and 0≤b≤0.4.

The positive electrode active material precursor prepared according to the present invention includes nickel (Ni), cobalt (Co), and manganese (Mn), wherein the nickel (Ni) and the cobalt (Co) are in non-oxidized hydroxide forms and the manganese (Mn) is in an oxidized form.

Also, the positive electrode active material precursor is in the form of a secondary particle in which primary particles are aggregated, wherein the primary particle may have a particle diameter of 50 nm to 500 nm, preferably 80 nm to 400 nm, and more preferably 100 nm to 300 nm. With respect to the positive electrode active material precursor prepared according to the embodiment of the present invention, the manganese (Mn) ions may be precipitated as an oxide by combining with the oxygen ($O_2$) gas added or oxygen ($O_2$) gas in the air even if the manganese (Mn) ions do not react with the alkaline compound after they are coordinated with the ammonium ions, or even if the manganese (Mn) ions are precipitated by reacting with the alkaline compound, since the precipitates may be oxidized in the reactor, the reaction rate may be very fast, and thus, primary particles smaller than the conventional precursor in the form of hydroxide may be formed. Since the positive electrode active material precursor satisfies the primary particle diameter range, the positive electrode active material precursor may exhibit high density due to small primary particles and dense secondary particles and may exhibit excellent particle strength.

Furthermore, the positive electrode active material precursor may have a high tap density of 1.4 g/cc or more, preferably 1.4 g/cc to 2.0 g/cc, and more preferably 1.5 g/cc to 1.8 g/cc. The tap density was measured by putting 50 g of the positive electrode active material precursor in a 50 ml mass cylinder and performing 1,250 strokes using a STAV-2 tap density meter (J. Engelsmann AG).

<Positive Electrode Active Material>

Also, the present invention provides a positive electrode active material which is prepared by using the positive electrode active material precursor.

The positive electrode active material of the present invention is prepared by a method including the steps of:

mixing the positive electrode active material precursor with a lithium raw material; and sintering at 750° C. to 1,000° C. after the mixing to form a lithium composite transition metal oxide.

First, the positive electrode active material precursor of the present invention and a lithium raw material are mixed.

The positive electrode active material precursor includes nickel (Ni), cobalt (Co), and manganese (Mn), wherein the nickel (Ni) and cobalt (Co) are in non-oxidized hydroxide forms and the manganese (Mn) is in an oxidized form.

As the lithium raw material, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

The positive electrode active material precursor and the lithium raw material may be mixed in amounts such that a molar ratio of the positive electrode active material precursor to lithium (Li) of the lithium raw material is in a range of 1:1.2 to 1:1.6, preferably 1:1.2 to 1:1.55, and more preferably 1:1.25 to 1:1.5. A Li-rich lithium composite transition metal oxide may be formed by mixing the positive electrode active material precursor and the lithium raw material in the above molar ratio, and, accordingly, high capacity may be achieved.

Next, a lithium composite transition metal oxide is formed by sintering at 750° C. to 1,000° C. after the mixing. Preferably, sintering may be performed at 800° C. to 975° C., for example, 850° C. to 950° C., and sintering may be performed for 5 hours to 20 hours, for example, 7 hours to 15 hours.

The positive electrode active material of the present invention thus prepared is a Li-rich lithium composite transition metal oxide in which a molar ratio (Li/M) of lithium (Li) to total metals (M) excluding the lithium is in a range of 1.2 to 1.6, wherein pellet density may be high, at 2.0 g/cc or more, preferably 2.2 g/cc to 3.0 g/cc, and more preferably 2.3 g/cc to 2.9 g/cc. 5 g of the positive electrode active material was put in a mold having a diameter of 22 mm, and the pellet density was measured at a pressure of 2 tons using HPRM-A2 (Hantech Co., Ltd.).

<Positive Electrode and Secondary Battery>

According to another embodiment of the present invention, provided are a positive electrode for a secondary battery and a lithium secondary battery which include the positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode active material layer in the form of a slurry, which includes selectively the binder and the conductive agent as well as the negative electrode active material, on the negative electrode collector and drying the coated negative electrode collector, or may be prepared by casting the composition for forming a negative electrode active material layer on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond, an aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

After 4 liters of distilled water was put in a co-precipitation reactor (capacity 20 L) and 100 ml of a 28 wt % aqueous ammonia solution was then added thereto while the temperature was maintained at 50° C., a transition metal cation-containing solution with a concentration of 3.2 mol/L, in which $NiSO_4$, $CoSO_4$, and $MnSO_4$ were mixed in amounts such that a molar ratio of nickel:cobalt:manganese was 2:2:6, and a 28 wt % aqueous ammonia solution were continuously added to the reactor at rates of 300 ml/hr and 42 ml/hr, respectively. Stirring was performed at an impeller speed of 400 rpm, and, in order to maintain a pH, a 40% wt % sodium hydroxide solution was added so that the pH was maintained at 9.5.

In this case, precursor particles of $0.4(Ni_{0.5}Co_{0.5}(OH)_2)$ .$0.6 (MnO_2)$ were formed by performing a co-precipitation reaction for 24 hours while supplying oxygen ($O_2$) gas at a rate of 13.0 L/hr. The precursor particles were separated, washed, and then dried in an oven at 130° C. to prepare a positive electrode active material precursor.

Comparative Example 1

After 4 liters of distilled water was put in a co-precipitation reactor (capacity 20 L), the reactor was purged with nitrogen ($N_2$) gas at a rate of 2 L/min for 1 hour while the temperature was maintained at 50° C. to remove oxygen in the reactor and create a non-oxidizing atmosphere in the reactor. After 100 ml of a 28 wt % aqueous ammonia solution was added, a metal aqueous solution with a concentration of 3.2 mol/L, in which $NiSO_4$, $CoSO_4$, and $MnSO_4$ were mixed in amounts such that a molar ratio of nickel:cobalt:manganese was 2:2:6, and a 28 wt % aqueous ammonia solution were continuously added to the reactor at rates of 300 ml/hr and 42 ml/hr, respectively. Stirring was performed at an impeller speed of 400 rpm. In order to maintain a pH, a 40% wt % sodium hydroxide solution was added so that the pH was maintained at 10.0. Precursor particles of $Ni_{0.2}Co_{0.2}Mn_{0.6}(OH)_2$ were formed by performing a co-precipitation reaction for 24 hours. The precursor particles were separated, washed, and then dried in an oven at 130° C. to prepare a positive electrode active material precursor.

Comparative Example 2

After 4 liters of distilled water was put in a co-precipitation reactor (capacity 20 L), the reactor was purged with nitrogen ($N_2$) gas at a rate of 2 L/min for 1 hour while the temperature was maintained at 50° C. to remove oxygen in the reactor and create a non-oxidizing atmosphere in the reactor. After 100 ml of a 28 wt % aqueous ammonia solution was added, a metal aqueous solution with a concentration of 3.2 mol/L, in which $NiSO_4$, $CoSO_4$, and $MnSO_4$ were mixed in amounts such that a molar ratio of nickel:cobalt:manganese was 2:2:6, and a 28 wt % aqueous ammonia solution were continuously added to the reactor at rates of 300 ml/hr and 42 ml/hr, respectively. Stirring was performed at an impeller speed of 400 rpm. In order to maintain a pH, a 20% wt % sodium carbonate solution was added so that the pH was maintained at 7.5. Precursor particles of $Ni_{0.2}Co_{0.2}Mn_{0.6}CO_3$ were formed by performing a co-precipitation reaction for 24 hours. The precursor particles were separated, washed, and then dried in an oven at 130° C. to prepare a positive electrode active material precursor.

Experimental Example 1: Precursor Particle Identification

The positive electrode active material precursors prepared in Example 1 and Comparative Examples 1 and 2 were identified by using X-ray photoelectron spectroscopy (XPS) and X-ray diffraction (XRD). The results thereof are presented in FIGS. 1 to 4. Specifically, in XPS analysis, an XPS test was conducted by obtaining a survey scan spectrum and a narrow scan spectrum using ESCALAB 250 (Thermo Fisher Scientific) equipment under analytical conditions with an accelerating voltage of 15 kV (power: 150 W), an energy resolution of about 1.0 eV, an analysis area diameter of 500 micrometers, and a sputter rate of 0.1 nm/sec, and, in XRD analysis, XRD measurements were performed using D4 ENDEAVOR (Bruker AXS GmbH) equipment at a rate of 3° per minute within a range of 10° to 90° at an accelerating voltage of 40 kV and an accelerating current of 40 mA using a Cu target.

Figure 1:
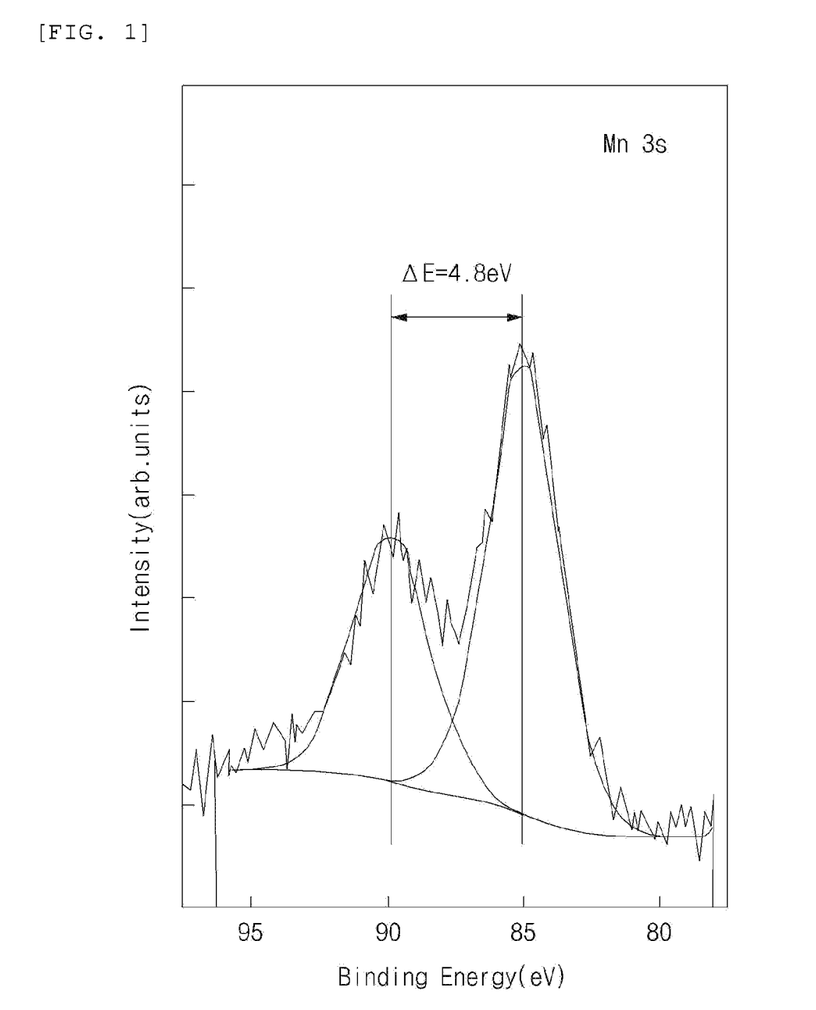
FIG. 1 is X-ray photoelectron spectroscopy (XPS) data of a positive electrode active material precursor prepared in Example 1.
Figure 2:
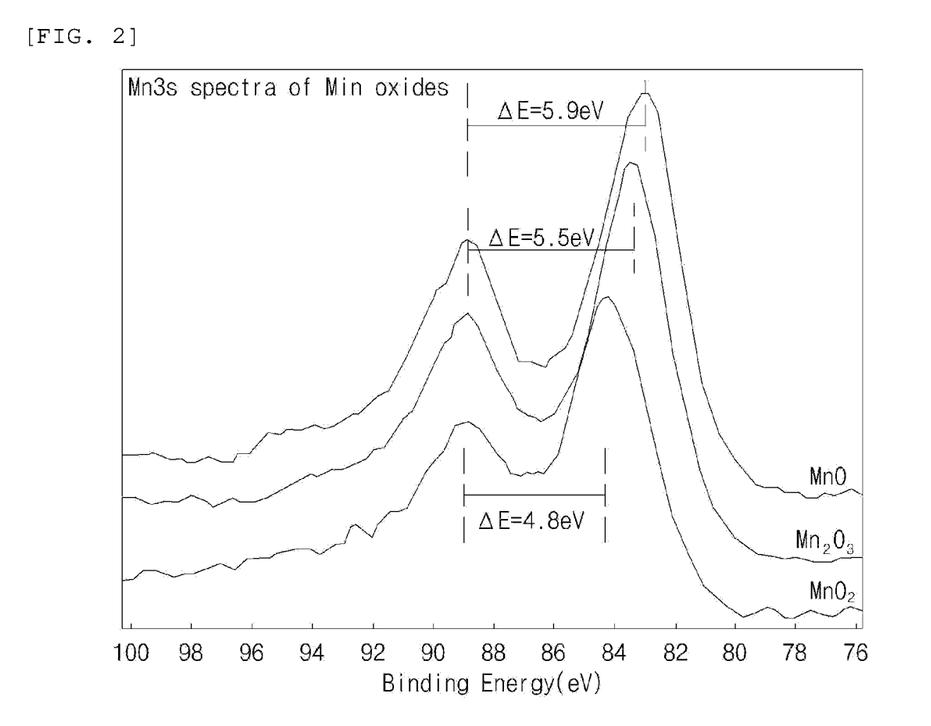
FIG. 2 is an XPS reference data of manganese oxides.

Referring to FIGS. 1 and 2 (XPS of Example 1 (FIG. 1) and reference data (FIG. 2)), an oxidation number of Mn may be known from an energy difference of two peaks separated in an XPS spectrum of Mn 3s, wherein, as may be seen from the reference data of FIG. 2, it may be confirmed that Mn oxide is in the form of $MnO_2$ in which Mn is tetravalent.

Figure 3:
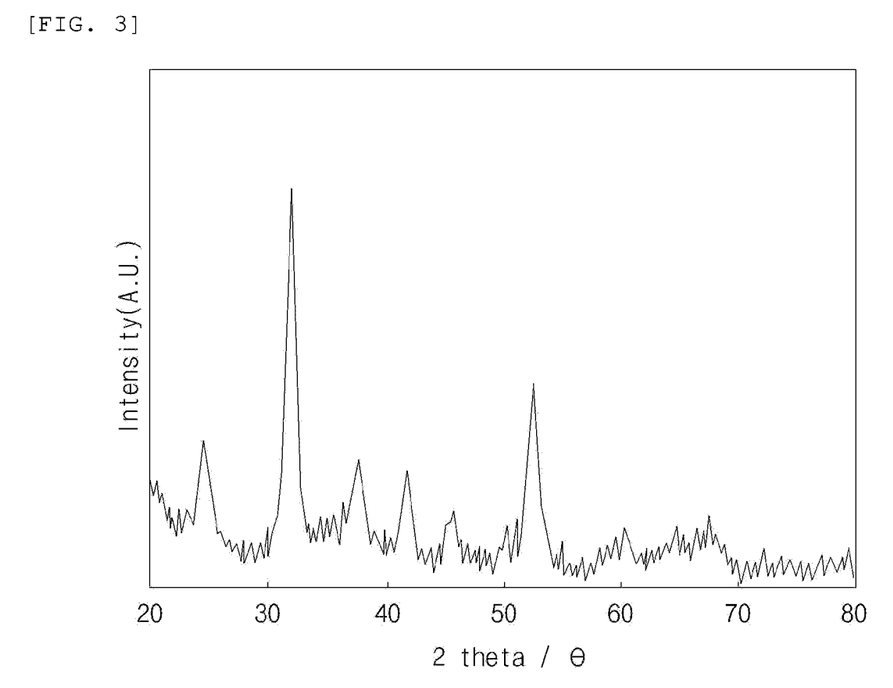
FIG. 3 is X-ray diffraction (XRD) data of a positive electrode active material precursor prepared in Comparative Example 1.
Figure 4:
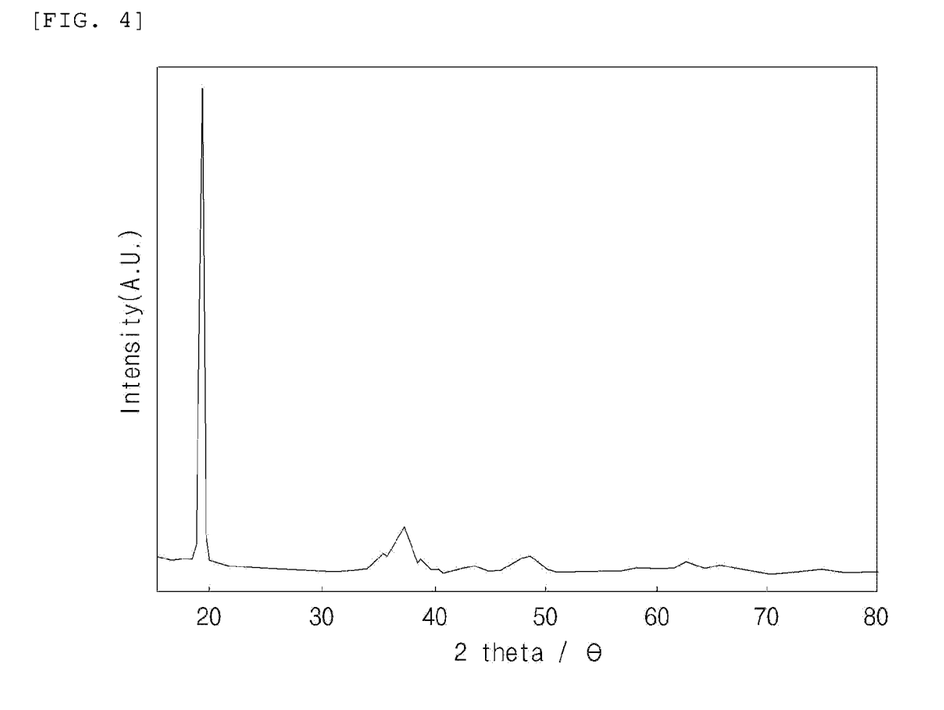
FIG. 4 is XRD data of a positive electrode active material precursor prepared in Comparative Example 2.

Referring to FIGS. 3 and 4 (XRD of Comparative Examples 1 and 2), it may be confirmed that Comparative Example 1 is in the form of hydroxide of Ni, Co, and Mn, and Comparative Example 2 is in the form of carbonate of Ni, Co, and Mn.

Figure 5:
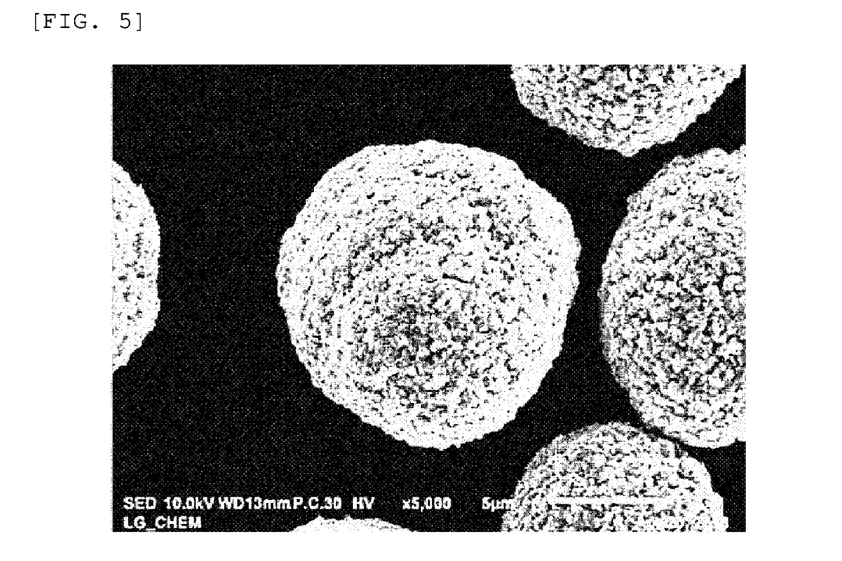
FIG. 5 is a magnified scanning electron microscope (SEM) image of the positive electrode active material precursor prepared in Comparative Example 1.
Figure 6:
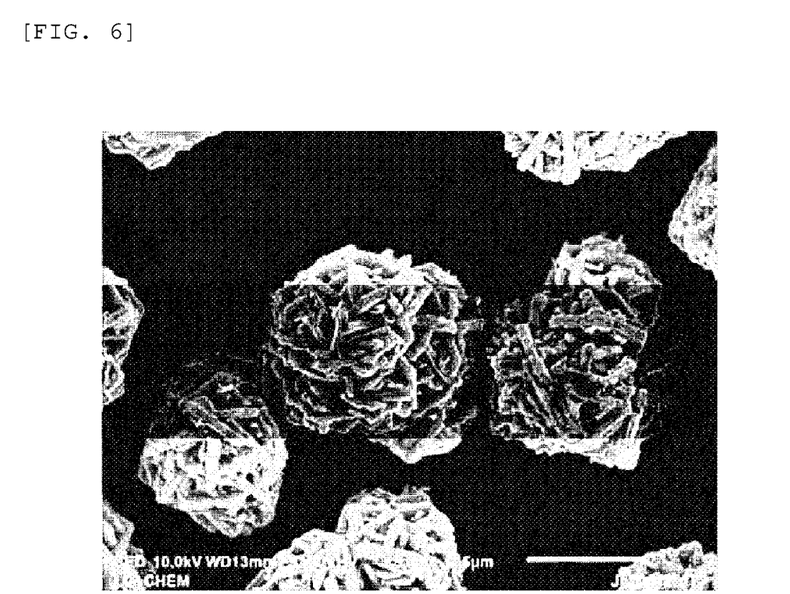
FIG. 6 is a magnified scanning electron microscope (SEM) image of the positive electrode active material precursor prepared in Comparative Example 2.
Figure 7:
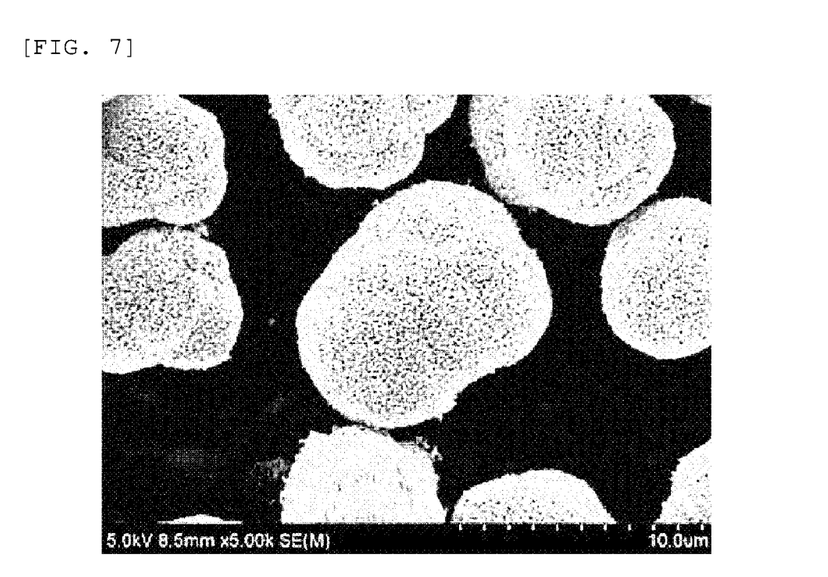
FIG. 7 is a magnified scanning electron microscope (SEM) image of the positive electrode active material precursor prepared in Example 1.

Magnified scanning electron microscope (SEM) images of the positive electrode active material precursors prepared in Example 1 and Comparative Examples 1 and 2 are illustrated in FIGS. 5 through 7. FIG. 6 illustrates the positive electrode active material precursor of Comparative Example 1 in the form of hydroxide, wherein it may be confirmed that a primary particle is large and a secondary particle is not dense, and FIG. 7 illustrates the positive electrode active material precursor of Comparative Example 2 in the form of carbonate, wherein it may be confirmed that a primary particle is excessively small and pores in a particle is large. In contrast, FIG. 5 illustrates the positive electrode active material precursor of Example 1, wherein it may be confirmed that a secondary particle is dense while a primary particle is small.

Experimental Example 2: Tap Density Measurement

Tap density was measured by putting 50 g of each of the positive electrode active material precursors prepared in Example 1 and Comparative Examples 1 and 2 in a 50 ml mass cylinder and performing 1,250 strokes using a STAV-2 tap density meter (J. Engelsmann AG). The results thereof are presented in Table 1 below.

TABLE 1

|  | Example 1 | Comparative Example 1 | Comparative Example 2 |
| --- | --- | --- | --- |
| Tap density (g/cc) | 1.55 | 1.24 | 1.37 |

Referring to Table 1, it may be confirmed that tap density of the positive electrode active material precursor of Example 1 was significantly higher than those of the positive electrode active material precursors of Comparative Examples 1 and 2 which were in the form of hydroxide/carbonate, respectively.

Example 2 and Comparative Examples 3 and 4

After each of the positive electrode active material precursors prepared in Example 1 and Comparative Examples 1 and 2 and a lithium raw material, LiOH, were mixed in amounts such that a molar ratio of the precursor to lithium (Li) of the LiOH was 1:1.35, powder was put in an alumina crucible, the temperature was increased to 550° C. in an air atmosphere, pre-sintering was then performed for 5 hours, and a pre-sintered product was cooled to room temperature, ground, and sieved. Then, after the temperature was increased to 900° C., sintering was performed for 10 hours to prepare positive electrode active materials of Example 2 and Comparative Examples 3 and 4.

Experimental Example 3: Pellet Density Measurement 5 g of each of the positive electrode active materials prepared in Example 2 and Comparative Examples 3 and 4 was put in a mold having a diameter of 22 mm, and pellet density was measured at a pressure of 2 tons using HPRM-A2 (Hantech Co., Ltd.). The results thereof are presented in Table 2 below.

TABLE 2

|  | Example 2 | Comparative Example 3 | Comparative Example 4 |
| --- | --- | --- | --- |
| Pellet density (@2 ton, g/cc) | 2.38 | 1.99 | 1.96 |

Referring to Table 2, it may be confirmed that pellet density of the positive electrode active material of Example 2 was significantly higher than those of the positive electrode active materials of Comparative Examples 3 and 4 which were prepared by using the positive electrode active material precursors in the form of hydroxide/carbonate, respectively.

Experimental Example 4: Lithium Secondary Battery Performance Evaluation

Each of the positive electrode active materials prepared in Example 2 and Comparative Examples 3 and 4, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 130° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC=3/5/2).

Each lithium secondary battery half cell prepared as described above was charged at 0.1 C to a voltage of 4.65 V in a constant current/constant voltage (CCCV) mode at 25° C. (termination current of 0.05 C), and discharged at a constant current of 0.1 C to a voltage of 2.0 V to measure initial charge and discharge capacity and efficiency. Also, C-rates were measured, and these were ratios of capacities when each half cell was respectively discharged at 0.5 C and 1 C to capacity when each half cell was charged at 0.1 C and discharged at 0.1 C. The results thereof are presented in Table 3.

TABLE 3

| | Initial charge capacity (mAh/g) | Initial discharge capacity (mAh/g) | Initial efficiency (%) | C-rate (0.5 C/ 0.1 C, %) | C-rate (1 C/ 0.1 C, %) |
|---|---|---|---|---|---|
| Example 2 | 295 | 252 | 85.4 | 89.2 | 78.1 |
| Comparative Example 3 | 301 | 224 | 74.4 | 80.8 | 62.9 |
| Comparative Example 4 | 286 | 224 | 78.3 | 84.6 | 68.9 |

Referring to Table 3, when the positive electrode active material of Example 2 was used, initial capacity, efficiency, and C-rates were better than those when the positive electrode active materials of Comparative Examples 3 and 4 were used.

The invention claimed is:

1. A positive electrode active material precursor for a secondary battery comprising nickel (Ni), cobalt (Co), and manganese (Mn),
wherein the nickel (Ni) and the cobalt (Co) are in non-oxidized hydroxide forms, and the manganese (Mn) is in an oxidized form,
wherein the positive electrode active material precursor is represented by Formula 1:

$$x(Ni_{1-a-b}Co_a M^1_b(OH)_2) \cdot y(MnO_2)$$ [Formula 1]

wherein, $M^1$ comprises at least one selected from the group consisting of iron (Fe), $0.25 \le x \le 0.5$, $0.5 \le y \le 0.75$, $x+y=1$, $0<a\le 0.6$, and $0 \le b \le 0.4$,
wherein the positive electrode active material precursor has a tap density in a range of 1.5 g/cc to 1.8 g/cc.

2. The positive electrode active material precursor of claim 1, wherein the positive electrode active material precursor is in a form of a secondary particle in which primary particles are aggregated, and a primary particle has a particle diameter of 50 nm to 500 nm.

3. The positive electrode active material precursor of claim 1, wherein a ratio of a lithium raw material to total metals (Li/M) is in a range from 1.2 to 1.6.

4. A method of preparing the positive electrode active material precursor of claim 1 for the secondary battery, comprising:
continuously adding nickel (Ni), cobalt (Co), and manganese (Mn) transition metal cation-containing solution, an alkaline solution, and an ammonium ion-containing solution to a reactor; and
forming the positive electrode active material precursor, in which the nickel (Ni) and the cobalt (Co) are in non-oxidized hydroxide forms and the manganese (Mn) is in the oxidized form, by co-precipitation while a gas is not added or an oxygen-containing gas is continuously added to the reactor.

5. The method of claim 4, wherein nitrogen ($N_2$), argon (Ar), and carbonic acid ($H_2CO_3$) gases are not added to the reactor.

6. The method of claim 4, wherein, when the oxygen-containing gas is added, a flow rate of oxygen ($O_2$) gas added satisfies Equation 1, (amount (mol) of manganese (Mn) added per hour× 2)/0.089≤flow rate (L/h) of oxygen ($O_2$) gas added≤1.1×{(amount (mol) of manganese (Mn) added per hour×2)/0.089}.  [Equation 1]

7. The method of claim 4, wherein the co-precipitation is performed by further adding the $M^1$ cation-containing solution to the reactor.

8. A method of preparing a positive electrode active material for a secondary battery, comprising:
mixing the positive electrode active material precursor prepared according to claim 4 with a lithium raw material; and
sintering at 750° C. to 1,000° C. after the mixing to form a lithium composite transition metal oxide.

9. The method of claim 8, wherein the positive electrode active material precursor and the lithium raw material are mixed in amounts such that a molar ratio of the positive electrode active material precursor to lithium (Li) of the lithium raw material is in a range of 1:1.2 to 1:1.6.

10. A positive electrode active material for a secondary battery which is prepared according to claim 8.

11. The positive electrode active material claim 10, wherein the positive electrode active material has a pellet density of 2.0 g/cc or more.

12. A positive electrode for a secondary battery, the positive electrode comprising the positive electrode active material of claim 10.

13. A lithium secondary battery comprising the positive electrode of claim 12.

14. The positive electrode active material of claim 10, wherein the positive electrode active material has a pellet density of 2.0 g/cc to 3.0 g/cc.

* * * * *